United States Patent [19]

Dearth

[11] 4,298,912
[45] Nov. 3, 1981

[54] ATTACHMENT FOR A VEHICLE DOME LIGHT

[76] Inventor: Miles B. Dearth, Columbus, Ohio

[21] Appl. No.: 82,982

[22] Filed: Oct. 9, 1979

[51] Int. Cl.³ ............................................. B60Q 1/06
[52] U.S. Cl. .................................... 362/66; 362/74;
362/255; 362/277; 362/329; 362/319
[58] Field of Search .................... 362/66, 74, 255, 256,
362/277, 282, 319, 322, 329, 434, 448

[56] References Cited

U.S. PATENT DOCUMENTS

| | | | |
|---|---|---|---|
| 2,536,799 | 1/1951 | Divizia | 362/73 |
| 2,999,150 | 9/1961 | Kawel | 362/74 |
| 3,514,010 | 5/1970 | Rossi | 362/74 |
| 4,142,227 | 2/1979 | Aikens | 362/74 |

FOREIGN PATENT DOCUMENTS

| | | | |
|---|---|---|---|
| 1132016 | 6/1962 | Fed. Rep. of Germany | 362/74 |
| 2209285 | 9/1973 | Fed. Rep. of Germany | 362/74 |

*Primary Examiner*—Donald P. Walsh

[57] ABSTRACT

An attachment for a vehicle dome light that converges the normal flood light pattern into a relatively narrow path for reading road maps or the like. The apparatus is readily installed and removed and includes means for varying the direction of the light path. The attachment is fabricated in an inexpensive manner by the snap-fit engagement of component parts of simple configuration.

8 Claims, 7 Drawing Figures

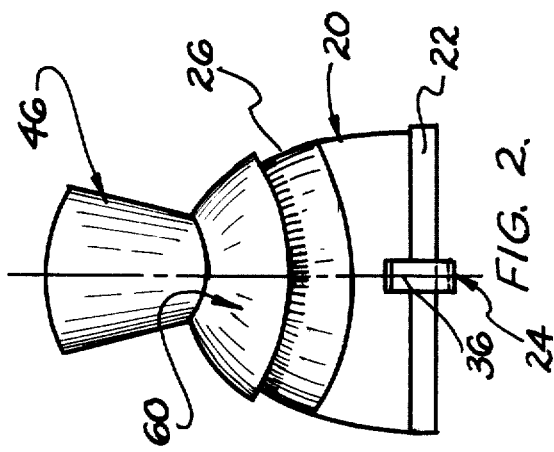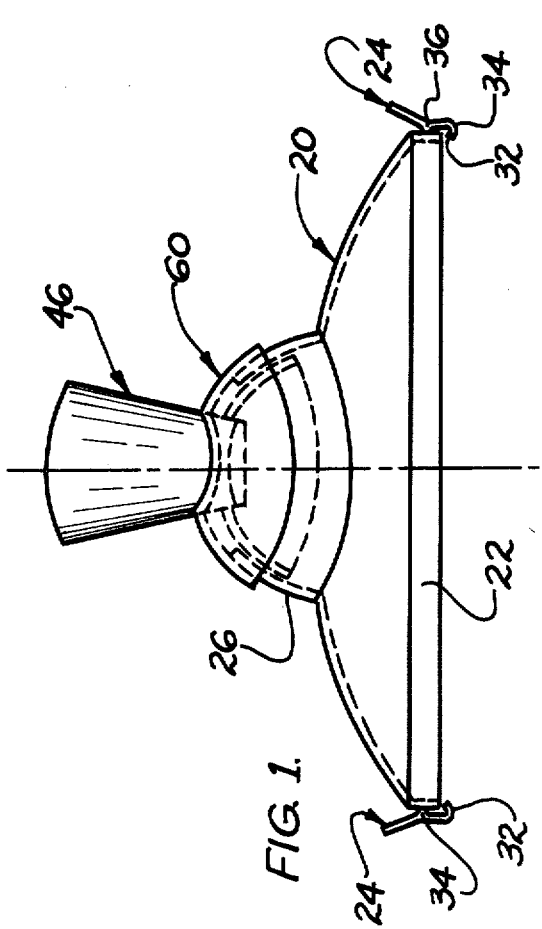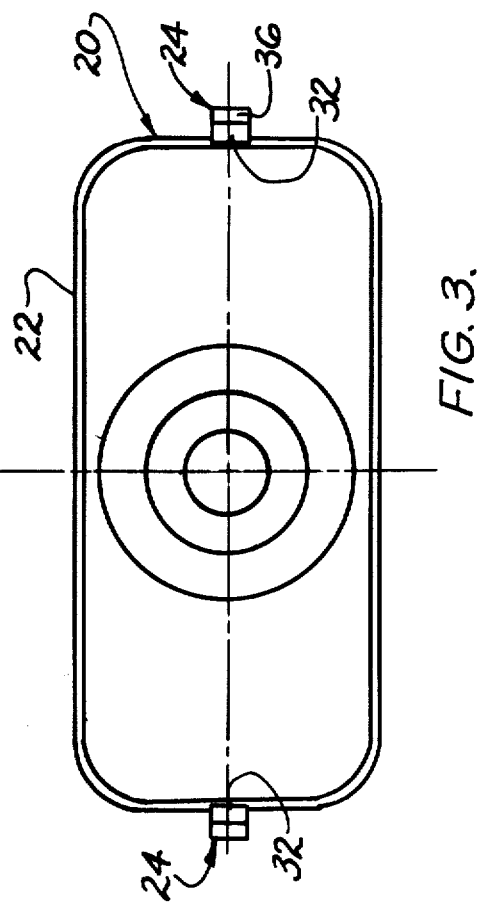

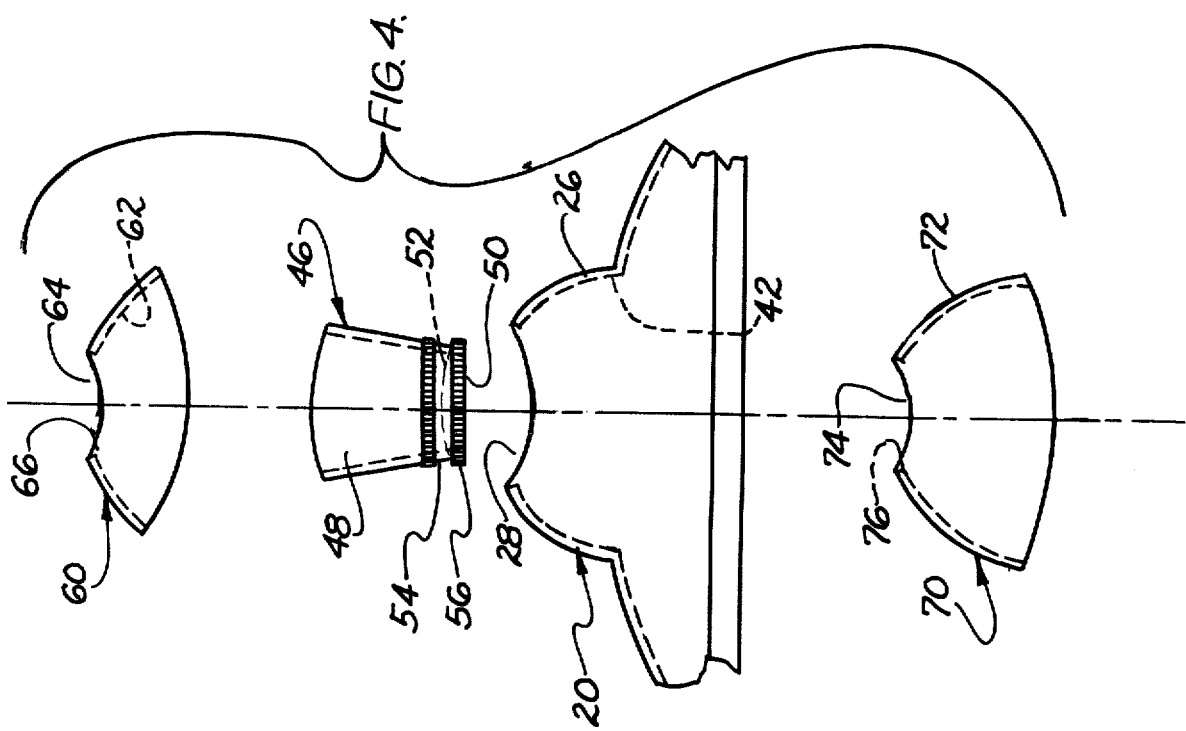
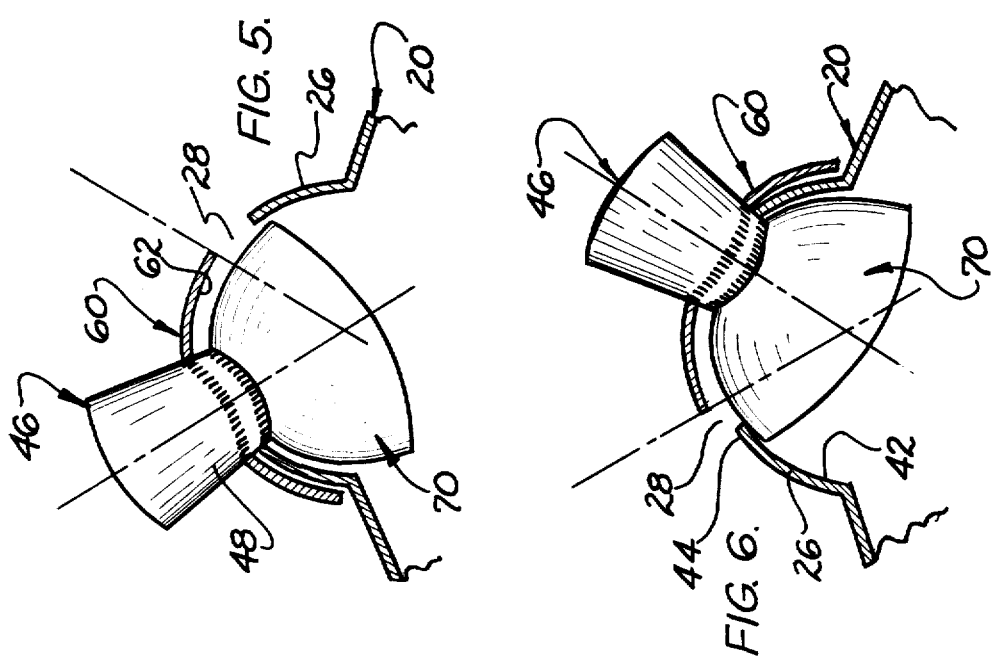

ATTACHMENT FOR A VEHICLE DOME LIGHT

BACKGROUND OF THE INVENTION

This invention relates generally to interior lighting for vehicles, and more particularly to a dome light attachment that converges the normal flood light pattern into a concentrated light path.

SUMMARY OF THE INVENTION

In general the present invention comprises a base means that conforms with the shape of the existing vehicle dome light and includes detachable mounting means whereby the attachment can be readily mounted on and removed from the dome light as required. The device further comprises a light emitting member mounted on said base means which member functions to converge the emitted flood light pattern into a narrow intensified light path, and which member is directionally adjustable, so as to direct the light path to the most convenient reading location for the particular person using the device.

The device also comprises inner and outer dish-shaped members for mounting the light emitting members. These dish-shaped members are assembled in a novel manner on the central light emitting member by simple snap-fit engagement of the components during the fabrication of the device. The unique configuration of the components and the simple assembly technique provides an adjustable mounting for the light emitting member on the base means with the parts being retained in various selected positions of adjustment by frictional engagement between confronting surfaces of said components.

It is therefore an object of the present invention to provide a novel attachment for a vehicle dome light which permits the operator to selectively use the existing dome light for the intended flood lighting effect, or as a map light whereby the lighting effect is concentrated over a relatively small area.

It is another object of the present invention to provide a novel apparatus of the type described that can be mounted or removed by a simple one-handed operation.

It is another object of the present invention to provide a novel apparatus of the type described that occludes illumination from the existing dome light, so as to prevent distraction of the driver.

It is another object of the present invention to provide a novel apparatus of the type described that can be inexpensively fabricated from simple components which are assembled in adjustable frictional relationship by snap-fit engagement of the parts.

Further objects and advantages of the present invention will be apparent from the following description, reference being had to the accompanying drawings wherein a preferred form of embodiment of the invention is clearly shown.

BRIEF DESCRIPTION OF THE DRAWINGS

FIG. 1 is a side elevational view of a dome light attachment constructed in accordance with the present invention;

FIGS. 2 and 3 are end and bottom elevational views corresponding to FIG. 1;

FIG. 4 is an exploded view of the apparatus of the preceeding figures;

FIGS. 5 and 6 are partial perspective views, partially in section, showing the components of the apparatus in various positions of adjustment.

Figure 7:
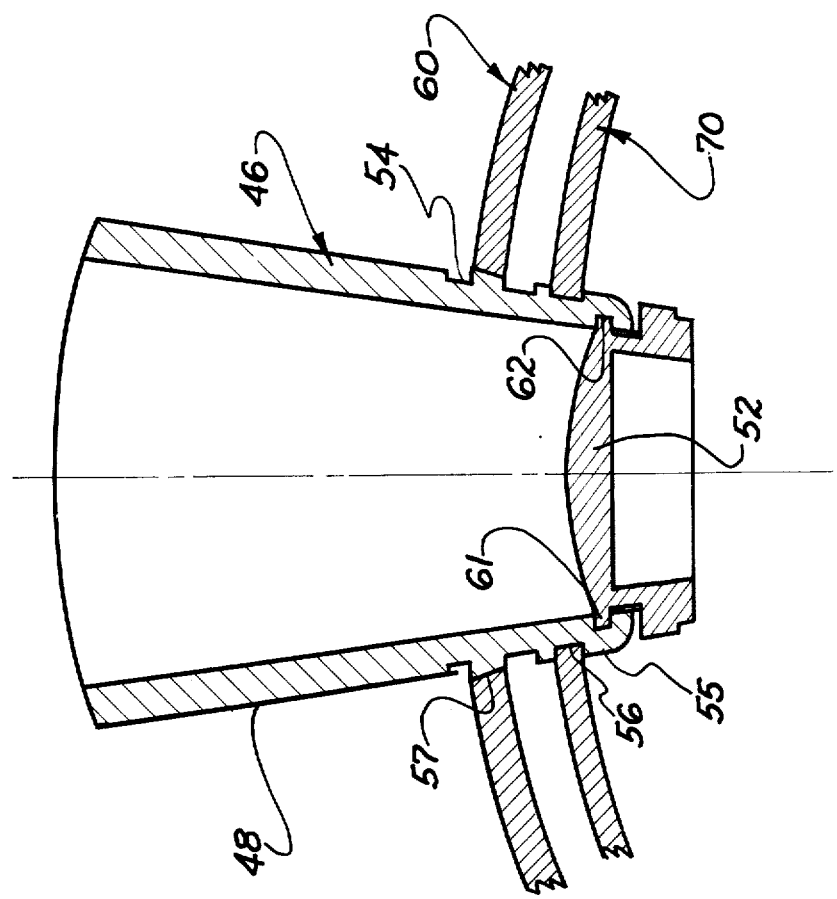
FIG. 7 is a partial sectional view of a light transmitting means comprising a portion of the apparatus of the preceeding Figures.

Referring in detail to the drawings, a dome light attachment constructed in accordance with the invention is illustrated in FIGS. 1-3 and includes a base means indicated generally at 20. Such base means includes a peripheral edge 22 that conforms generally with the size and shape of the peripheral frame of the existing vehicle dome light supplied with the vehicle as original equipment.

The base means 20 is provided with two mounting means 24 which are preferably integrally molded with the other portions of base means 24, including the spherical central portion 26 and central bore or light emitting window 28.

As is best seen in FIGS. 1-3, each mounting means 24 includes a hook portion 32, a flexible hinge portion 34, and a tab portion 36. When the oppositely located tab portions 36 of the two mounting means are squeezed towards one another, the hook portions 32 are spread so as to receive and hook under the conventional peripheral frame of the dome light.

As is best seen in FIGS. 4-6, the above mentioned spherical central portion 26 of base means 20 includes a spherical inner surface 42 and a spherical outer surface 44.

With reference to FIGS. 4-6 a light transmitting means indicated generally at 46 includes a central shank portion extended through central opening 28 in the spherical portion of base means 20. The light transmitting means is of hollow conical or tapered cylindrical configuration, so as to include a hood portion 48 and an inner lens mounting portion 50 for engaging the periphery of a lens 52 in the light path.

Reference is next made to FIG. 7 which illustrates in enlarged section the structural details provided on the light transmitting means of hood 46 for the mounting of outer dish-shaped member 60 and inner dish-shaped members 60 and 70 are mounted during assembly of the device by pressing each into place in a respective mounting groove 54 and 56, provided on the outer surface of light transmitting means 46.

With continued reference to FIGS. 4 and 7, dish-shaped member 60 includes an inwardly facing spherical surface 62 and a central bore 64, FIG. 4 and is assembled, by inserting the mounting end 50 of said light transmitting means 46 into central bore 64. The bore 64 includes an inwardly facing annular dish shoulder 66 which is pressed over an outwardly facing hood shoulder 57, the latter being tapered to faciliate assembly of dish shoulder 66 into annular mounting groove 54.

In FIG. 7 the outer dish-shaped member 60 is shown in a position wherein its inwardly facing shoulder has been partially forced over hood shoulder 57 in the step of assembly dish shoulder 66 into groove 54.

It should be pointed out that the diameter of bore 64 in dish-shaped member 60 is slightly less than the diameter of the bottom annular surface of mounting groove 54 to permit press-fit frictional engagement of inwardly facing shoulder 66 with said bottom surface of its respective mounting groove 54.

Referring again to FIGS. 4 and 7, the apparatus further includes an inner annular dish-shaped member 70 provided with an outwardly facing spherical surface 72 that conforms with said inner spherical surface 42 on base means 20. Such member 70 further comprises a central bore 74 having an inner edge forming an inwardly annular dish shoulder 76, which is pressed over an outwardly facing hood shoulder 55, the latter being tapered to facilitate assembly of dish shoulder 76 into annular mounting groove 56.

It should be mentioned that the diameter of central bore 74 in dish-shaped member 70 is slightly less than the diameter of the bottom annular surface of mounting groove 56 to provide for press-fit frictional engagement of inwardly facing annular shoulder 76 with said bottom surface of its respective mounting groove 56.

It should be mentioned that the cylindrical light transmitting member 46 and the two dish-shaped members 60 and 70 are formed of yieldable plastic material such that the above mentioned integrally formed shoulder will yield into press-fit engagement as described above, when these members are assembled.

It should further be mentioned that close tolerances should be established according to the particular plastic material used, so as to precisely locate the dish-shaped members 60 and 70 with respect to the axial spacing thereof along the longitudinal axis of the light transmitting member 46. Hence, the dish-shaped memers will be located in their assembled positions, so as to sandwich the spherical portion 26 of the base means with the spherical outer surface 44 on the base means in frictional engagement with spherical inner surface 62, and with the spherical outwardly facing surface 72 in frictional engagement with the inner spherical surface 42 on the base means.

It should also be mentioned that the outer spherical surface 72 of inner dish shaped member 70 is tapered or formed with a slightly different radius compared to inner surface 42 on spherical central portion 26 on base means 20, such that when said inner dish-shaped member 70 is pressed into snap-fit engagement with inner shoulder 56, said inner dish-shaped member 70 yields and is compressed into conformity with inner spherical surface 42 on the base means 20. This compressed engagement between inner dish-shaped member 70 and inner surface 42 creates tension between the two surfaces from the resilience in the plastic material resulting in a frictional force which thereby maintains the light emitting member in its selected position of adjustment.

With reference to FIGS. 5 and 6, light transmitting member 46 has limited pivotal movement with respect to base means 20, since the diameter of central bore 28 in the base means is greater than the outside diameter of light transitting member 46 at the portion thereof between the previously mentioned mounting grooves 54 and 56.

As seen in FIG. 7, the previously mentioned lens 52 is preferably mounted on the inner end of light transmitting member 46 by press-fit engagement of a shoulder 61 formed on the periphery of the lens with an annular groove 62 provided in the inner surface of light transmitting member 46.

I claim:

1. An attachment for a vehicle dome light comprising, in combination, base means including a peripheral base portion that substantially conforms with the periphery of the frame of said dome light, and a central spherical portion provided with a spherical inner surface, a spherical outer surface, and a central opening; mounting means on said base means for detachable engagement with said dome light frame; and light transmitting means moveably mounted on the base means for directing a path of light therefrom and including an outwardly facing surface confronting said inner spherical surface, an inwardly facing surface confronting said outer spherical surface, and a shank portion extended freely through said central opening of the base means to permit articulation of the light transmitting means relative to the base means in all radial directions about a common center for said spherical surfaces so as to vary the angle of said path of light.

2. An attachment for a vehicle dome light comprising, in combination, base means including a peripheral base portion that substantially conforms with the periphery of the frame of said dome light, and a central spherical portion provided with a spherical inner surface, a spherical outer surface, and a central opening; mounting means on said base means for detachable engagement with said dome light frame; an inner dish-shaped member confronting said spherical inner surface of said spherical base portion; an outer dish-shaped member confronting said spherical outer surface of said spherical base portion; and light transmitting means connecting said inner and outer dish-shaped members, said light transmitting means including a central shank portion extended freely through said base opening to permit angular adjustment of said light transmitting means about a common center for said spherical surfaces.

3. The apparatus defined in claim 1 wherein said light transmitting means comprises a central cylindrical member for transmitting said path of light; and an annular member forming certain of said outwardly and inwardly facing surfaces and including a central bore in press-fit mounted engagement with said central cylindrical member.

4. The apparatus defined in claim 1 wherein said light transmitting means comprises a central cylindrical member for transmitting said path of light; and inner annular member forming said outwardly facing surface of the light transmitting means and a central bore in press-fit mounted engagement with said central cylindrical member, and an outer annular member forming said inwardly facing surface of the light transmitting means and a central bore in press-fit mounted engagement with said cylindrical member.

5. The apparatus defined in claim 1 wherein said light transmitting means comprises a central cylindrical member for transmitting said path of light; and including an inner annular shoulder, an outer annular shoulder, and an annular recess between said shoulders; inner and outer annular members mounted in said annular recess, said central spherical portion of the base means being sandwiched between said annular members in moveable frictional engagement therewith.

6. The apparatus defined in claim 5 wherein one of said annular members includes a central bore forming a radically inwardly facing shoulder that is snapped over one of the annular shoulders on the central cylindrical member.

7. An attachment for a vehicle dome light comprising, in combination, base means including a light emitting window in overlying relationship with said dome light and a spherical surface surrounding said window; a light transmitting member extended freely through said window and including a lens for converging rays from the dome light into a relatively narrow inner path; and an inner and outer annular members mounted on the light transmitting member and including a second spherical surface engaging and concentric with said first spherical surface for freedom of spherical articulation in all directions with respect to a central position for the light transmitting member.

8. The dome light attachment defined in claim 7 wherein the apparatus is assembled by pressing certain of the annular members into snap-fit engagement with the light transmitting member with the window of the base means positioned between the annular members.

* * * * *